United States Patent
Khlat et al.

(10) Patent No.: US 9,929,752 B2
(45) Date of Patent: Mar. 27, 2018

(54) RF RECEIVE DIPLEXER

(71) Applicant: RF Micro Devices, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 320 days.

(21) Appl. No.: 14/681,725

(22) Filed: Apr. 8, 2015

(65) Prior Publication Data

US 2015/0288389 A1  Oct. 8, 2015

Related U.S. Application Data

(60) Provisional application No. 61/976,958, filed on Apr. 8, 2014, provisional application No. 62/033,880, filed on Aug. 6, 2014.

(51) Int. Cl.
| | | |
|---|---|---|
| *H04B 1/00* | (2006.01) | |
| *H04B 7/01* | (2006.01) | |
| *H04B 7/08* | (2006.01) | |
| *H04B 1/18* | (2006.01) | |

(52) U.S. Cl.
CPC ............ *H04B 1/0057* (2013.01); *H04B 1/18* (2013.01); *H04B 7/01* (2013.01); *H04B 7/0837* (2013.01)

(58) Field of Classification Search
CPC ........ H04B 1/00; H04B 1/0458; H04B 1/246; H04B 7/01
See application file for complete search history.

(56) References Cited

U.S. PATENT DOCUMENTS

| | | | | |
|---|---|---|---|---|
| 6,167,286 | A | * | 12/2000 | Ward .................... H01Q 1/246 455/132 |
| 8,149,742 | B1 | | 4/2012 | Sorsby |
| 9,042,275 | B2 | | 5/2015 | Bauder et al. |
| 9,048,805 | B2 | | 6/2015 | Granger-Jones et al. |
| 9,071,430 | B2 | | 6/2015 | Bauder et al. |
| 9,083,518 | B2 | | 7/2015 | Bauder et al. |
| 9,608,688 | B2 | | 3/2017 | Khlat |
| 2010/0102899 | A1 | | 4/2010 | Engel |

(Continued)

OTHER PUBLICATIONS

Notice of Allowance for U.S. Appl. No. 14/820,006, dated May 19, 2017, 8 pages.

*Primary Examiner* — Andrew Lai
*Assistant Examiner* — Leon Andrews
(74) *Attorney, Agent, or Firm* — Withrow & Terranova, P.L.L.C.

(57) ABSTRACT

A first RF receive diplexer, which includes a first hybrid RF coupler, a second hybrid RF coupler, and RF filter circuitry, is disclosed. The first hybrid RF coupler has a first main port, a first pair of quadrature ports, and a first isolation port, which is coupled to an RF antenna. The second hybrid RF coupler has a second main port and a second pair of quadrature ports. The RF filter circuitry is coupled between the first pair of quadrature ports and the second pair of quadrature ports. The first RF receive diplexer receives a first adjunct RF antenna receive signal via the first isolation port to provide a first adjunct RF receive signal via the second main port. The first RF receive diplexer receives a first RF transmit signal via the first main port to provide a first RF antenna transmit signal via the first isolation port.

28 Claims, 12 Drawing Sheets

(56) References Cited

U.S. PATENT DOCUMENTS

2010/0261442 A1\* 10/2010 Paculdo ............... H04B 1/0458
 455/110
2015/0341058 A1 11/2015 Khlat et al.

\* cited by examiner

RF RECEIVE DIPLEXER

RELATED APPLICATIONS

This application claims the benefit of U.S. provisional patent applications No. 61/976,958, filed Apr. 8, 2014, and No. 62/033,880, filed Aug. 6, 2014, the disclosures of which are incorporated herein by reference in their entireties.

FIELD OF THE DISCLOSURE

Embodiments of the present disclosure relate to radio frequency (RF) communications systems, which may include RF front-end circuitry, RF transceiver circuitry, RF transmit circuitry, RF receive circuitry, RF diplexers, RF duplexers, RF filters, RF antennas, RF switches, RF combiners, RF splitters, the like, or any combination thereof.

BACKGROUND

As wireless communications technologies evolve, wireless communications systems become increasingly sophisticated. As such, wireless communications protocols continue to expand and change to take advantage of the technological evolution. As a result, to maximize flexibility, many wireless communications devices must be capable of supporting any number of wireless communications protocols, each of which may have certain performance requirements, such as specific out-of-band emissions requirements, linearity requirements, or the like. Further, portable wireless communications devices are typically battery powered and need to be relatively small, and have low cost. As such, to minimize size, cost, and power consumption, RF circuitry in such a device needs to be as simple, small, flexible, and efficient as is practical. Thus, there is a need for RF circuitry in a communications device that is low cost, small, simple, flexible, and efficient.

SUMMARY

A first RF receive diplexer, which includes a first hybrid RF coupler, a second hybrid RF coupler, and RF filter circuitry, is disclosed according to one embodiment of the present disclosure. The first hybrid RF coupler has a first main port, a first pair of quadrature ports, and a first isolation port, which is coupled to an RF antenna. The second hybrid RF coupler has a second main port and a second pair of quadrature ports. The RF filter circuitry is coupled between the first pair of quadrature ports and the second pair of quadrature ports. The first RF receive diplexer receives a first adjunct RF antenna receive signal via the first isolation port to provide a first adjunct RF receive signal via the second main port. The first RF receive diplexer receives a first RF transmit signal via the first main port to provide a first RF antenna transmit signal via the first isolation port.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

A first RF receive diplexer, which includes a first hybrid RF coupler, a second hybrid RF coupler, and RF filter circuitry, is disclosed according to one embodiment of the present disclosure. The first hybrid RF coupler has a first main port, a first pair of quadrature ports, and a first isolation port, which is coupled to an RF antenna. The second hybrid RF coupler has a second main port and a second pair of quadrature ports. The RF filter circuitry is coupled between the first pair of quadrature ports and the second pair of quadrature ports. The first RF receive diplexer receives a first adjunct RF antenna receive signal via the first isolation port to provide a first adjunct RF receive signal via the second main port. The first RF receive diplexer receives a first RF transmit signal via the first main port to provide a first RF antenna transmit signal via the first isolation port.

Figure 1:
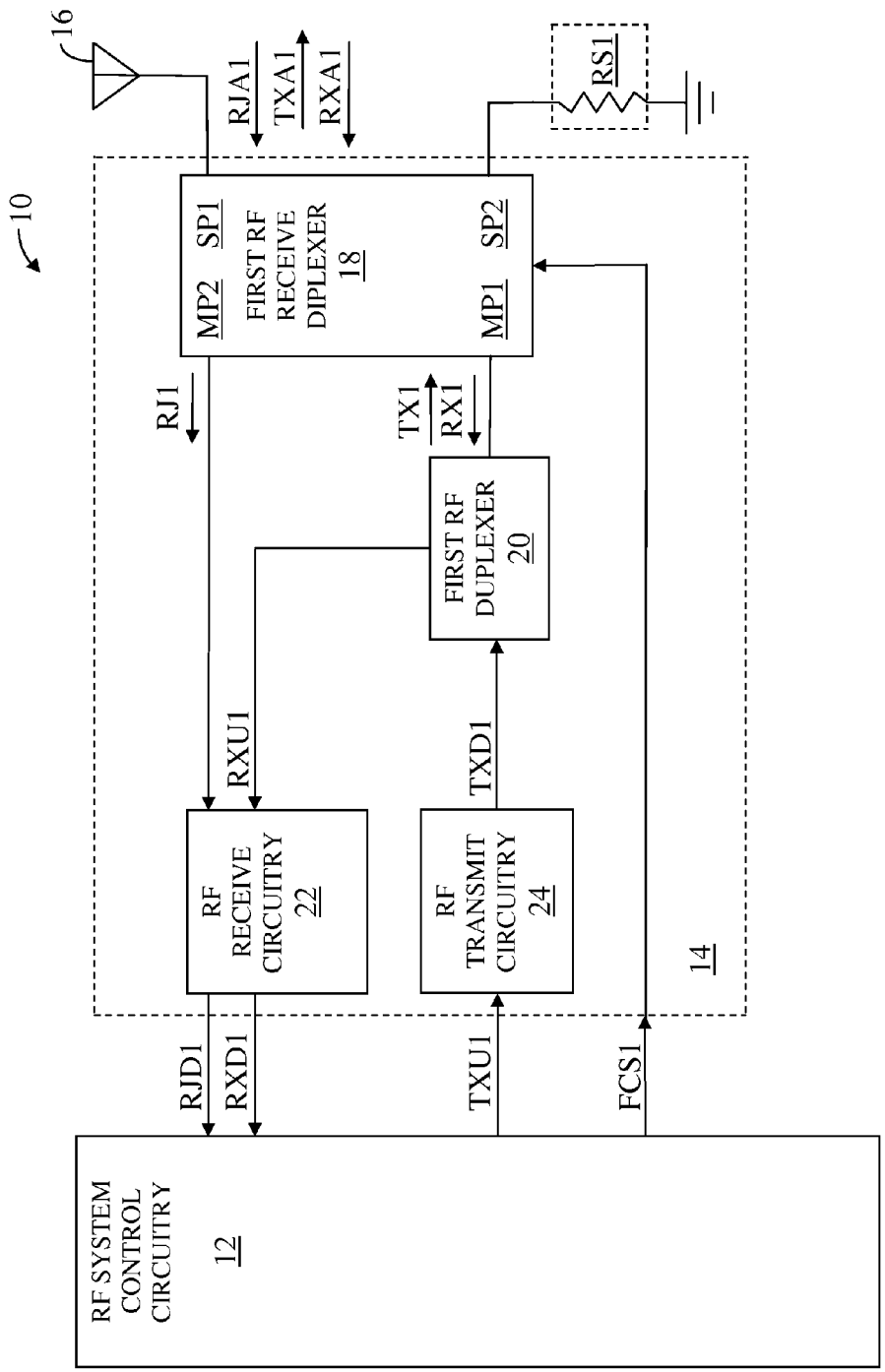
FIG. 1 shows RF communications circuitry according to one embodiment of the RF communications circuitry.

FIG. 1 shows RF communications circuitry 10 according to one embodiment of the RF communications circuitry 10. The RF communications circuitry 10 includes RF system control circuitry 12, RF front-end circuitry 14, a first RF antenna 16, and a first isolation port resistive element RS1. The RF front-end circuitry 14 includes a first RF receive diplexer 18, a first RF duplexer 20, RF receive circuitry 22, and RF transmit circuitry 24. The first RF receive diplexer 18 has a first main port MP1, a second main port MP2, a first isolation port SP1, and a second isolation port SP2. The first main port MP1 is coupled to the first RF duplexer 20. The second main port MP2 is coupled to the RF receive circuitry 22. The first isolation port SP1 is coupled to the first RF antenna 16. The first isolation port resistive element RS1 is coupled between the second isolation port SP2 and ground. The RF system control circuitry 12 provides a first function configuration signal FCS1 to the first RF receive diplexer 18.

In one embodiment of the RF system control circuitry 12, the RF system control circuitry 12 provides a first upstream RF transmit signal TXU1 to the RF transmit circuitry 24, which processes the first upstream RF transmit signal TXU1 to provide a first downstream RF transmit signal TXD1 to the first RF duplexer 20.

The RF transmit circuitry 24 may include up-conversion circuitry, amplification circuitry, power supply circuitry, filtering circuitry, switching circuitry, combining circuitry, splitting circuitry, dividing circuitry, clocking circuitry, the like, or any combination thereof to process the first upstream RF transmit signal TXU1.

In one embodiment of the RF receive circuitry 22, the RF receive circuitry 22 receives and processes a first adjunct RF receive signal RJ1 to provide a first downstream adjunct RF receive signal RJD1 to the RF system control circuitry 12. Additionally, in one embodiment of the RF receive circuitry 22, the RF receive circuitry 22 receives and processes a first upstream RF receive signal RXU1 to provide a first downstream RF receive signal RXD1 to the RF system control circuitry 12. The first RF duplexer 20 provides the first upstream RF receive signal RXU1 to the RF receive circuitry 22. In an alternate embodiment of the RF receive circuitry 22, the first upstream RF receive signal RXU1 and the first downstream RF receive signal RXD1 are omitted.

In an additional embodiment of the RF receive circuitry 22, the RF receive circuitry 22 simultaneously receives and processes the first upstream RF receive signal RXU1 and the first adjunct RF receive signal RJ1, respectively, to provide the first downstream RF receive signal RXD1 and the first downstream adjunct RF receive signal RJD1, respectively.

In one embodiment of the RF receive circuitry 22, the RF receive circuitry 22 supports receive downlink carrier aggregation (RXDLCA) by simultaneously receiving and processing the first upstream RF receive signal RXU1 and the first adjunct RF receive signal RJ1. The RF receive circuitry 22 may include down-conversion circuitry, amplification circuitry, low noise amplification circuitry, power supply circuitry, filtering circuitry, switching circuitry, combining circuitry, splitting circuitry, dividing circuitry, clocking circuitry, the like, or any combination thereof.

In one embodiment of the RF front-end circuitry 14, any or all of the first upstream RF transmit signal TXU1, the first downstream RF transmit signal TXD1, the first upstream RF receive signal RXU1, the first downstream RF receive signal RXD1, the first adjunct RF receive signal RJ1, and the first downstream adjunct RF receive signal RJD1 are omitted.

An RF duplexer is a well-known RF device in the art having a common port (not shown), a transmit signal port (not shown), and a receive signal port (not shown). Combined RF receive and transmit signals at the common port are separated into an RF receive signal at the receive signal port and an RF transmit signal at the transmit signal port. The RF duplexer is used to at least partially isolate the receive signal port from the RF transmit signal to help receive performance by avoiding receiver de-sensitization of RF receive circuitry by the RF transmit signal. The RF transmit signal and the RF receive signal are separated by a duplex frequency. Additionally, the RF transmit signal and the RF receive signal fall within one respective RF communications band.

The first RF duplexer 20 receives and provides a first RF receive signal RX1 and a first RF transmit signal TX1, respectively. In one embodiment of the first RF duplexer 20, the first RF duplexer 20 receives and provides the first RF receive signal RX1 and the first RF transmit signal TX1 simultaneously. In one embodiment of the first RF duplexer 20, the first RF receive signal RX1 and the first RF transmit signal TX1 are not received and provided simultaneously. In one embodiment of the first RF duplexer 20, the first RF receive signal RX1 is omitted. In one embodiment of the first RF duplexer 20, the first RF transmit signal TX1 is omitted. In one embodiment of the first RF duplexer 20, both the first RF receive signal RX1 and the first RF transmit signal TX1 are omitted. In one embodiment of the RF communications circuitry 10, the first RF duplexer 20 is omitted.

In one embodiment of the first RF duplexer 20, the first RF duplexer 20 receives and forwards the first RF receive signal RX1 to provide the first upstream RF receive signal RXU1. In one embodiment of the first RF duplexer 20, the first RF duplexer 20 receives and forwards the first downstream RF transmit signal TXD1 to provide the first RF transmit signal TX1. In one embodiment of the first RF duplexer 20, the first RF duplexer 20 at least partially isolates the first downstream RF transmit signal TXD1 and the first RF transmit signal TX1 from the RF receive circuitry 22.

As previously mentioned, the first RF receive diplexer 18 has the first main port MP1, and the second main port MP2. The first isolation port SP1 is coupled to the first RF antenna 16. The first main port MP1 is coupled to the first RF duplexer 20. The second main port MP2 is coupled to the RF receive circuitry 22. In general, in one embodiment of the first RF receive diplexer 18, the first RF receive diplexer 18 separates combined RF signals at the first isolation port SP1 into separate RF signals at each of the first main port MP1 and the second main port MP2. In one embodiment of the first RF receive diplexer 18, RF signals at the first main port MP1 are associated with one RF communications band, and RF signals at the second main port MP2 are associated with another RF communications band. Therefore, RF signals at the first isolation port SP1 may be associated with both RF communications bands.

By segregating the RF signals in this manner, processing of the RF signals may be simplified, may enhance RF performance, or both. In one embodiment of the first RF receive diplexer 18, the first main port MP1 is substantially isolated from the second main port MP2. The first RF receive diplexer 18 receives and forwards the first RF transmit signal TX1 via the first main port MP1 to the first isolation port SP1 to provide a first RF antenna transmit signal TXA1.

The first RF receive diplexer 18 receives and forwards a first RF antenna receive signal RXA1 via the first RF antenna 16 to the first main port MP1 to provide the first RF receive signal RX1. As such, the first RF receive diplexer 18 receives the first RF antenna receive signal RXA1 via the first isolation port SP1 to provide the first RF receive signal RX1 via the first main port MP1. Additionally, the first RF receive diplexer 18 receives and forwards a first adjunct RF antenna receive signal RJA1 via the first RF antenna 16 and the first isolation port SP1 to the second main port MP2 to provide the first adjunct RF receive signal RJ1. In one embodiment of the first RF receive diplexer 18, the first RF receive diplexer 18 establishes RXDLCA by receiving the first RF antenna receive signal RXA1 and the first adjunct RF antenna receive signal RJA1 simultaneously. As such, the first RF antenna receive signal RXA1 and the first adjunct RF antenna receive signal RJA1 are RXDLCA signals. Therefore, the first RF receive signal RX1 and the first adjunct RF receive signal RJ1 are carrier aggregation RF receive signals. In one embodiment of the first RF receive diplexer 18, the first RF receive diplexer 18 receives the first RF transmit signal TX1 and the first adjunct RF antenna receive signal RJA1 simultaneously.

In one embodiment of the RF front-end circuitry 14, any or all of the first RF transmit signal TX1, the first RF antenna transmit signal TXA1, the first RF receive signal RX1, the first RF antenna receive signal RXA1, the first adjunct RF receive signal RJ1, and the first RF antenna receive signal RXA1 are omitted.

In one embodiment of the RF system control circuitry 12 and the first RF receive diplexer 18, the RF system control circuitry 12 provides the first function configuration signal FCS1 to the first RF receive diplexer 18. As such, the RF system control circuitry 12 may configure, tune, adjust, enable, disable, vary, or any combination thereof, circuits within the first RF receive diplexer 18 as necessary using the first function configuration signal FCS1.

Figure 2:
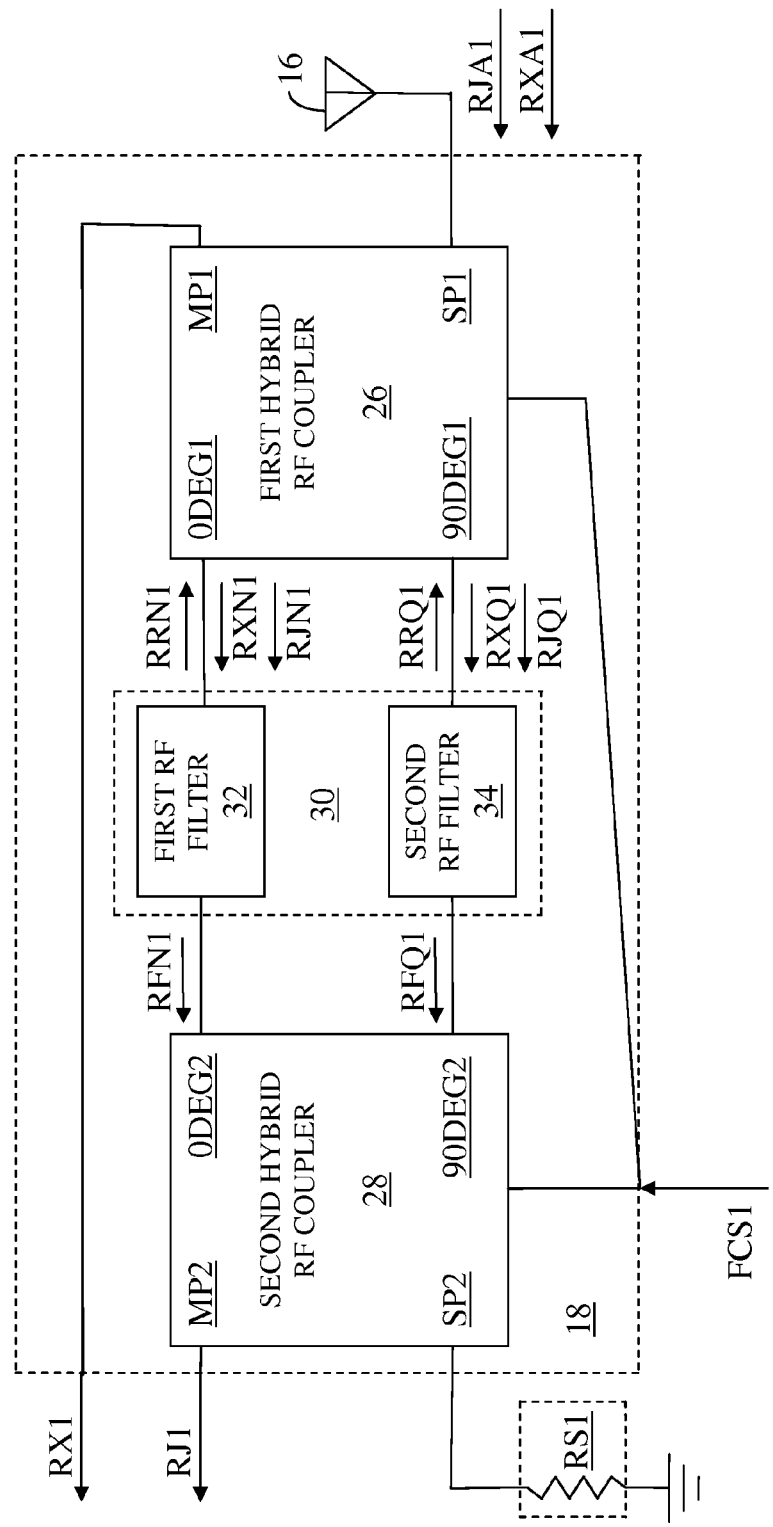
FIG. 2 shows details of a first RF receive diplexer, a first RF antenna, and a first isolation port resistive element illustrated in FIG. 1 according to one embodiment of the first RF receive diplexer, the first RF antenna, and the first isolation port resistive element.

FIG. 2 shows details of the first RF receive diplexer 18, the first RF antenna 16, and the first isolation port resistive element RS1 illustrated in FIG. 1 according to one embodiment of the first RF receive diplexer 18, the first RF antenna 16, and the first isolation port resistive element RS1. The first RF receive diplexer 18 includes a first hybrid RF coupler 26, a second hybrid RF coupler 28, and RF filter circuitry 30, which includes a first RF filter 32 and a second RF filter 34.

The first hybrid RF coupler 26 has the first main port MP1, a first in-phase port 0DEG1, a first quadrature-phase port 90DEG1, and the first isolation port SP1. The first isolation port SP1 is coupled to the first RF antenna 16. The second hybrid RF coupler 28 has the second main port MP2, a second in-phase port 0DEG2, a second quadrature-phase port 90DEG2, and the second isolation port SP2. The first isolation port resistive element RS1 is coupled between the second isolation port SP2 and ground. The first in-phase port 0DEG1 and the first quadrature-phase port 90DEG1 provide a first pair of quadrature ports. The second in-phase port 0DEG2 and the second quadrature-phase port 90DEG2 provide a second pair of quadrature ports.

The RF filter circuitry 30 is coupled between the first pair of quadrature ports and the second pair of quadrature ports. As such, the first RF filter 32 is coupled between the first in-phase port 0DEG1 and the second in-phase port 0DEG2. The second RF filter 34 is coupled between the first quadrature-phase port 90DEG1 and the second quadrature-phase port 90DEG2.

In one embodiment of the first isolation port resistive element RS1, the first isolation port resistive element RS1 is adjusted to compensate for an impedance mismatch between the first RF antenna 16 and the first isolation port SP1.

The first hybrid RF coupler 26 receives, splits, and phase-shifts a first RF antenna receive signal RXA1 via the first isolation port SP1, to provide a first in-phase RF receive signal RXN1 via the first in-phase port 0DEG1, and further provide a first quadrature-phase RF receive signal RXQ1 via the first quadrature-phase port 90DEG1. In general, the first in-phase RF receive signal RXN1 and the first quadrature-phase RF receive signal RXQ1 are provided to the RF filter circuitry 30. Additionally, the first hybrid RF coupler 26 receives, splits, and phase-shifts a first adjunct RF antenna receive signal RJA1 via the first isolation port SP1, to provide a first adjunct in-phase RF receive signal RJN1 via the first in-phase port 0DEG1, and further provide a first adjunct quadrature-phase RF receive signal RJQ1 via the first quadrature-phase port 90DEG1.

The first RF filter 32 and the second RF filter 34 each present a substantially high impedance to the first in-phase RF receive signal RXN1 and the first quadrature-phase RF receive signal RXQ1, respectively. As a result, the first in-phase RF receive signal RXN1 and the first quadrature-phase RF receive signal RXQ1 are substantially reflected by the first RF filter 32 and the second RF filter 34, respectively, to provide a first reflected in-phase RF receive signal RRN1 and a first reflected quadrature-phase RF receive signal RRQ1, respectively. In general, the RF filter circuitry 30 presents a substantially high impedance to the first in-phase RF receive signal RXN1 and the first quadrature-phase RF receive signal RXQ1. As such, in general, the first in-phase RF receive signal RXN1 and the first quadrature-phase RF receive signal RXQ1 are substantially reflected by the RF filter circuitry 30 to provide the first reflected in-phase RF receive signal RRN1 and the first reflected quadrature-phase RF receive signal RRQ1 to the first hybrid RF coupler 26.

The first hybrid RF coupler 26 receives, phase-shifts, and then combines the first reflected in-phase RF receive signal RRN1 and the first reflected quadrature-phase RF receive signal RRQ1, respectively, via the first in-phase port 0DEG1 and the first quadrature-phase port 90DEG1, respectively, to provide the first RF receive signal RX1 via the first main port MP1.

The first RF filter 32 receives and filters the first adjunct in-phase RF receive signal RJN1 to provide a first filtered in-phase RF receive signal RFN1. The second RF filter 34 receives and filters the first adjunct quadrature-phase RF receive signal RJQ1 to provide a first filtered quadrature-phase RF receive signal RFQ1.

The second hybrid RF coupler 28 receives, phase-shifts, and then combines the first filtered in-phase RF receive signal RFN1 and the first filtered quadrature-phase RF receive signal RFQ1, respectively, via the second in-phase port 0DEG2 and the second quadrature-phase port 90DEG2, respectively, to provide the first adjunct RF receive signal RJ1 via the second main port MP2. In one embodiment of the first RF receive diplexer 18, the first RF receive diplexer 18 receives the first adjunct RF antenna receive signal RJA1 and the first RF antenna receive signal RXA1 simultaneously, such that the first adjunct RF antenna receive signal RJA1 and the first RF antenna receive signal RXA1 are carrier aggregation RF receive signals.

In one embodiment of the first RF filter 32, a filter response of the first RF filter 32 to RF signals received from the first in-phase port 0DEG1 is approximately equal to a filter response of the first RF filter 32 to RF signals received from the second in-phase port 0DEG2, such that the first RF filter 32 has an approximately symmetrical filter response. In one embodiment of the second RF filter 34, a filter response of the second RF filter 34 to RF signals received from the first quadrature-phase port 90DEG1 is approximately equal to a filter response of the second RF filter 34 to RF signals received from the second quadrature-phase port 90DEG2, such that the second RF filter 34 has an approximately symmetrical filter response.

The first hybrid RF coupler 26 and the second hybrid RF coupler 28 both receive the first function configuration signal FCS1. In one embodiment of the first hybrid RF coupler 26 and the second hybrid RF coupler 28, either the first hybrid RF coupler 26, the second hybrid RF coupler 28, or both may be adjusted for a desired phase-shift, desired magnitude, or both between each of the first pair of quadrature ports, between each of the second pair of quadrature ports, or both.

Figure 3:
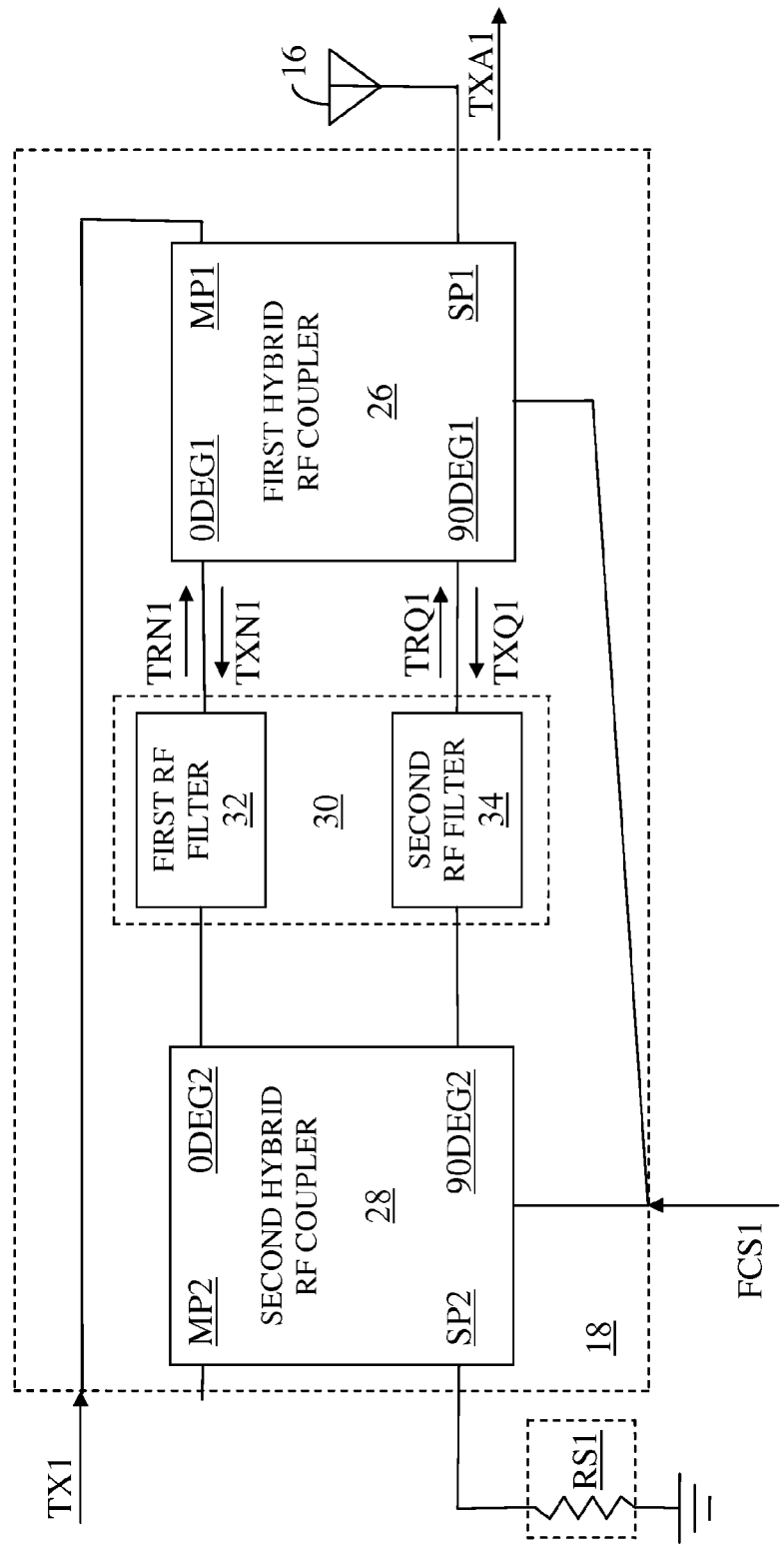
FIG. 3 shows details of the first RF receive diplexer, the first RF antenna, and the first isolation port resistive element illustrated in FIG. 1 according to an alternate embodiment of the first RF receive diplexer, the first RF antenna, and the first isolation port resistive element.

FIG. 3 shows details of the first RF receive diplexer 18, the first RF antenna 16, and the first isolation port resistive element RS1 illustrated in FIG. 1 according to an alternate embodiment of the first RF receive diplexer 18, the first RF antenna 16, and the first isolation port resistive element RS1. The first RF receive diplexer 18, the first RF antenna 16, and the first isolation port resistive element RS1 illustrated in FIG. 3 are similar to the first RF receive diplexer 18, the first RF antenna 16, and the first isolation port resistive element RS1 illustrated in FIG. 2, except in the first RF receive diplexer 18 illustrated in FIG. 3, the first RF receive diplexer 18 is used to transmit the first RF antenna transmit signal TXA1 using the first RF antenna 16.

As such, the first hybrid RF coupler 26 receives the first RF transmit signal TX1 via the first main port MP1. The first hybrid RF coupler 26 receives, splits, and phase-shifts the first RF transmit signal TX1 to provide a first in-phase RF transmit signal TXN1 via the first in-phase port 0DEG1 and further provide a first quadrature-phase RF transmit signal TXQ1 via the first quadrature-phase port 90DEG1. In general, the first in-phase RF transmit signal TXN1 and the first quadrature-phase RF transmit signal TXQ1 are provided to the RF filter circuitry 30, which substantially reflects the first in-phase RF transmit signal TXN1 and the first quadrature-phase RF transmit signal TXQ1.

The first RF filter 32 and the second RF filter 34 each present a substantially high impedance to the first in-phase RF transmit signal TXN1 and the first quadrature-phase RF transmit signal TXQ1, respectively. As a result, the first in-phase RF transmit signal TXN1 and the first quadrature-phase RF transmit signal TXQ1 are substantially reflected by the first RF filter 32 and the second RF filter 34, respectively, to provide a first reflected in-phase RF transmit signal TRN1 and a first reflected quadrature-phase RF transmit signal TRQ1, respectively. The first hybrid RF coupler 26 receives, phase-shifts, and then combines the first reflected in-phase RF transmit signal TRN1 and the first reflected quadrature-phase RF transmit signal TRQ1, respectively, via the first in-phase port 0DEG1 and the first quadrature-phase port 90DEG1, respectively, to provide the first RF antenna transmit signal TXA1 via the first isolation port SP1.

In one embodiment of the second hybrid RF coupler 28, any of the first in-phase RF transmit signal TXN1 and the first quadrature-phase RF transmit signal TXQ1 that is allowed through the RF filter circuitry 30 is substantially, received, phase-shifted, and cancelled by the second hybrid RF coupler 28, thereby increasing isolation between the first main port MP1 and the second main port MP2. In one embodiment of the second hybrid RF coupler 28, the second hybrid RF coupler 28 is a tunable hybrid RF coupled, such that a magnitude, a phase-shift, or both that is applied to the residual of the first in-phase RF transmit signal TXN1 and the first quadrature-phase RF transmit signal TXQ1 that is allowed through the RF filter circuitry 30 is adjustable based on the first function configuration signal FCS1.

In one embodiment of the first hybrid RF coupler 26, the first hybrid RF coupler 26 is a tunable hybrid RF coupler, such that the first hybrid RF coupler 26 is tuned based on the first function configuration signal FCS1. As such, a magnitude, a phase-shift, or both that is applied to the first in-phase RF transmit signal TXN1 and the first quadrature-phase RF transmit signal TXQ1 is adjustable based on the first function configuration signal FCS1.

Figure 4:
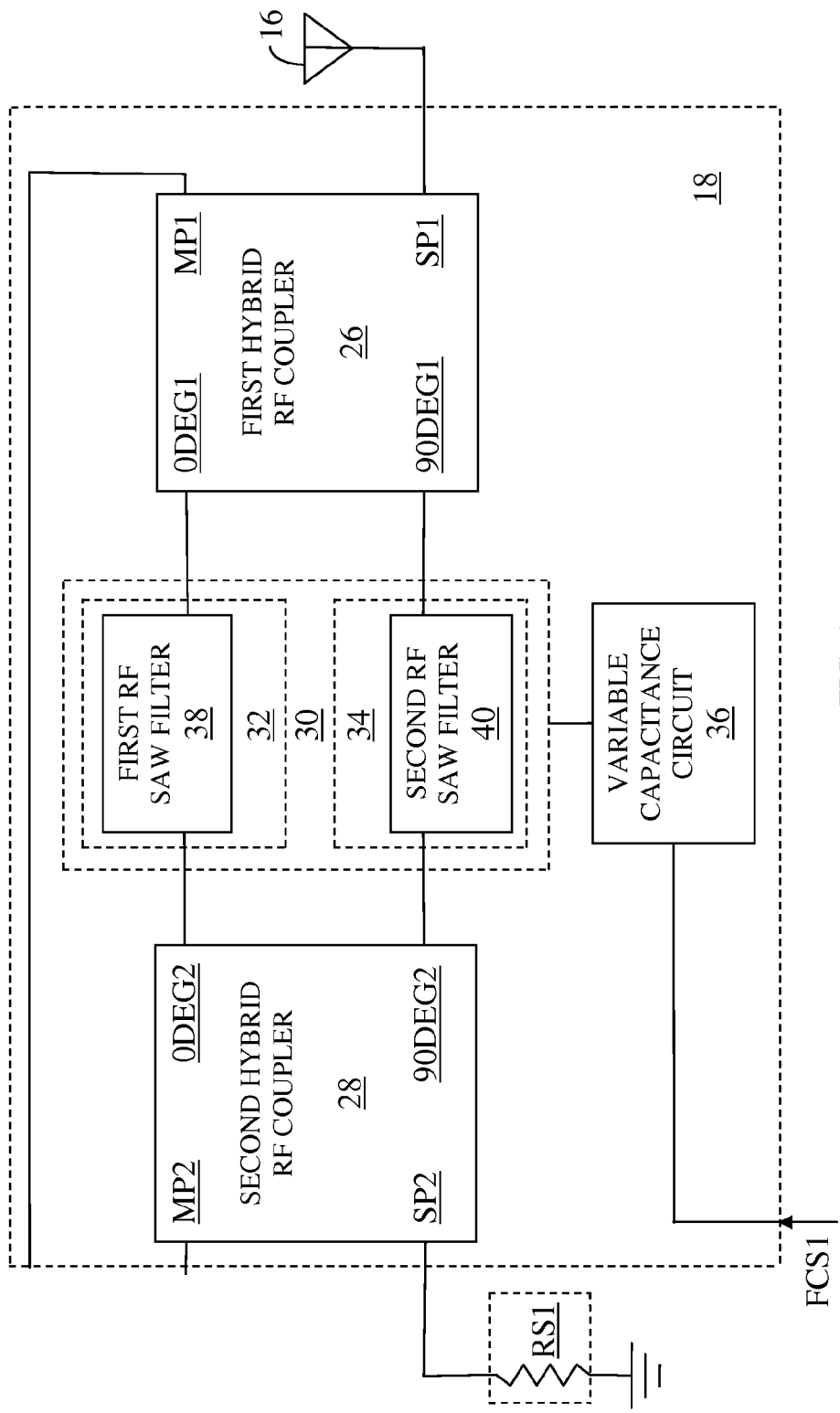
FIG. 4 shows details of the first RF receive diplexer, the first RF antenna, and the first isolation port resistive element illustrated in FIG. 1 according to an additional embodiment of the first RF receive diplexer, the first RF antenna, and the first isolation port resistive element.

FIG. 4 shows details of the first RF receive diplexer 18, the first RF antenna 16, and the first isolation port resistive element RS1 illustrated in FIG. 1 according to an additional embodiment of the first RF receive diplexer 18, the first RF antenna 16, and the first isolation port resistive element RS1. The first RF receive diplexer 18, the first RF antenna 16, and the first isolation port resistive element RS1 illustrated in FIG. 4 are similar to the first RF receive diplexer 18, the first RF antenna 16, and the first isolation port resistive element RS1 illustrated in FIG. 2, except in the first RF receive diplexer 18 illustrated in FIG. 4, the first RF receive diplexer 18 further includes a variable capacitance circuit 36, the first RF filter 32 includes a first RF surface acoustic wave (SAW) filter 38, and the second RF filter 34 includes a second RF SAW filter 40.

In general, the first RF SAW filter 38 and the second RF SAW filter 40 provide SAW RF filter circuitry coupled between the first pair of quadrature ports and the second pair of quadrature ports. The variable capacitance circuit 36 provides at least one variable capacitance to the SAW RF filter circuitry. As such, filtering characteristics of the RF filter circuitry 30 are based on at least the one variable capacitance, which is based on the first function configuration signal FCS1. In an alternate embodiment of the first RF receive diplexer 18, the variable capacitance circuit 36 is omitted.

Figure 5:
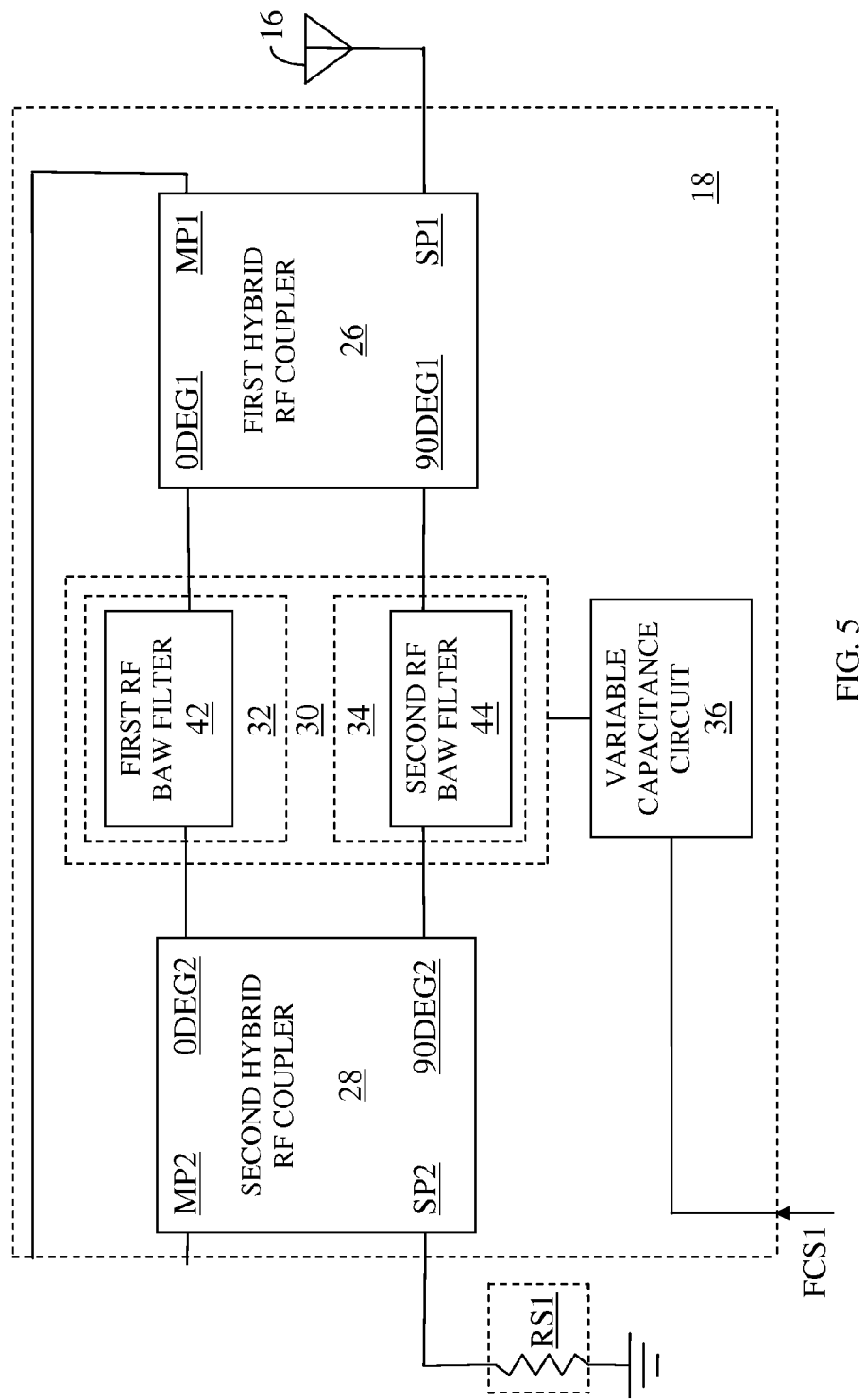
FIG. 5 shows details of the first RF receive diplexer, the first RF antenna, and the first isolation port resistive element illustrated in FIG. 1 according to another embodiment of the first RF receive diplexer, the first RF antenna, and the first isolation port resistive element.

FIG. 5 shows details of the first RF receive diplexer 18, the first RF antenna 16, and the first isolation port resistive element RS1 illustrated in FIG. 1 according to another embodiment of the first RF receive diplexer 18, the first RF antenna 16, and the first isolation port resistive element RS1. The first RF receive diplexer 18, the first RF antenna 16, and the first isolation port resistive element RS1 illustrated in FIG. 5 are similar to the first RF receive diplexer 18, the first RF antenna 16, and the first isolation port resistive element RS1 illustrated in FIG. 2, except in the first RF receive diplexer 18 illustrated in FIG. 5, the first RF receive diplexer 18 further includes the variable capacitance circuit 36, the first RF filter 32 includes a first RF bulk acoustic wave (BAW) filter 42, and the second RF filter 34 includes a second RF BAW filter 44.

In general, the first RF BAW filter 42 and the second RF BAW filter 44 provide BAW RF filter circuitry coupled between the first pair of quadrature ports and the second pair of quadrature ports. The variable capacitance circuit 36 provides at least one variable capacitance to the BAW RF filter circuitry. As such, filtering characteristics of the RF filter circuitry 30 are based on at least the one variable capacitance, which is based on the first function configuration signal FCS1. In an alternate embodiment of the first RF receive diplexer 18, the variable capacitance circuit 36 is omitted.

Figure 6:
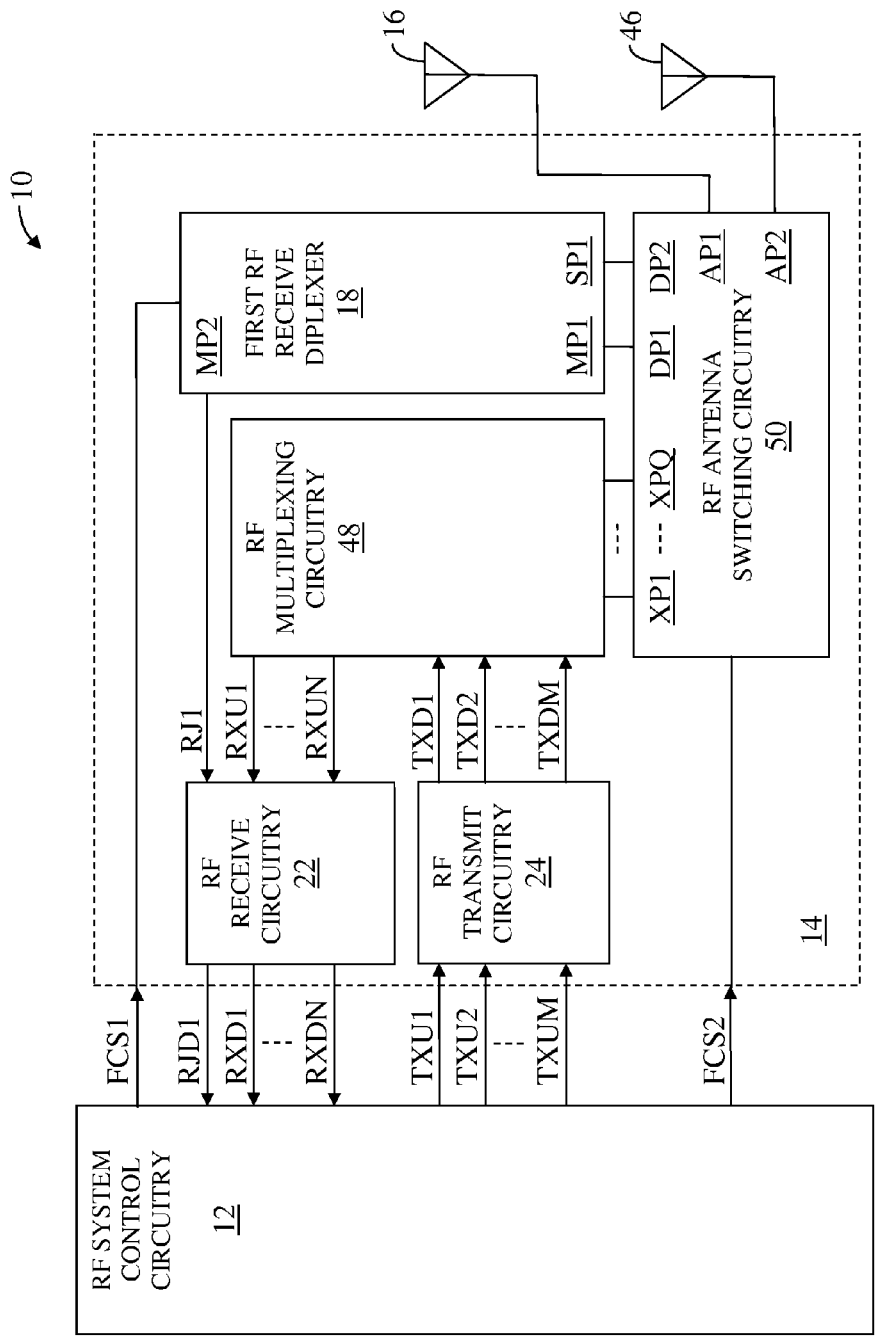
FIG. 6 shows the RF communications circuitry according to one embodiment of the RF communications circuitry.

FIG. 6 shows the RF communications circuitry 10 according to one embodiment of the RF communications circuitry 10. The RF communications circuitry 10 illustrated in FIG. 6 is similar to the RF communications circuitry 10 illustrated in FIG. 1, except in the RF communications circuitry 10 illustrated in FIG. 6, the RF communications circuitry 10 further includes a second RF antenna 46, the first RF duplexer 20 is omitted, and the RF front-end circuitry 14 further includes RF multiplexing circuitry 48 and RF antenna switching circuitry 50.

The RF antenna switching circuitry 50 has a first RF antenna port AP1, a second RF antenna port AP2, a first RF diplexer port DP1, a second RF diplexer port DP2, a first RF multiplexer port XP1, and up to and including a $Q^{TH}$ RF multiplexer port XPQ. The first RF antenna 16 is coupled to the first RF antenna port AP1. The second RF antenna 46 is coupled to the second RF antenna port AP2. The first main port MP1 is coupled to the first RF diplexer port DP1. The first isolation port SP1 is coupled to the second RF diplexer port DP2. The RF multiplexer ports XP1, XPQ are coupled to the RF multiplexing circuitry 48.

In general, the RF antenna switching circuitry 50 provides connectivity between the RF antennas 16, 46, the first RF receive diplexer 18, and the RF multiplexing circuitry 48. The second RF diplexer port DP2 provides connectivity between the first RF receive diplexer 18 and the RF antennas 16, 46 using the RF antenna switching circuitry 50. The first RF diplexer port DP1 provides connectivity between the first RF receive diplexer 18 and the RF multiplexing circuitry 48 using the RF antenna switching circuitry 50. Further, the RF antenna switching circuitry 50 provides connectivity between the RF multiplexing circuitry 48 and the RF antennas 16, 46. The RF system control circuitry 12 provides a second function configuration signal FCS2 to the RF antenna switching circuitry 50, such that switching configurations of the RF antenna switching circuitry 50 are based on the second function configuration signal FCS2.

The RF multiplexing circuitry 48 provides the first upstream RF receive signal RXU1 and up to and including an $N^{TH}$ upstream RF receive signal RXUN to the RF receive circuitry 22, which processes the upstream RF receive signals RXU1, RXUN to provide a downstream RF receive signals RXD1, RXDN to the RF system control circuitry 12. In alternate embodiments of the RF multiplexing circuitry 48, any of the RF receive signals RXU1, RXUN, RXD1, RXDN may be omitted.

Similarly, the RF system control circuitry 12 provides the first upstream RF transmit signal TXU1, a second upstream RF transmit signal TXU2, and up to and including an $M^{TH}$ upstream RF transmit signal TXUM to the RF transmit circuitry 24. The RF transmit circuitry 24 processes the upstream RF transmit signals TXU1, TXU2, TXUM to provide downstream RF transmit signals TXD1, TXD2, TXDM to the RF multiplexing circuitry 48. In alternate embodiments of the RF system control circuitry 12, any of the RF transmit signals TXU1, TXU2, TXUN, TXD1, TXD2, TXDN may be omitted.

In one embodiment of the RF front-end circuitry 14, the first RF receive diplexer 18 and the RF multiplexing circuitry 48 combine to provide multiplexing functionality. As such, by providing the first adjunct RF receive signal RJ1, the first RF receive diplexer 18 adds one level of multiplexing to the RF multiplexing circuitry 48. As such, in a first embodiment of the RF multiplexing circuitry 48, the RF multiplexing circuitry 48 functions as an RF duplexer. Therefore, a combination of the RF multiplexing circuitry 48 and the first RF receive diplexer 18 functions as an RF triplexer.

In a second embodiment of the RF multiplexing circuitry 48, the RF multiplexing circuitry 48 functions as an RF triplexer. Therefore, the combination of the RF multiplexing circuitry 48 and the first RF receive diplexer 18 functions as an RF quadplexer. In a third embodiment of the RF multiplexing circuitry 48, the RF multiplexing circuitry 48 functions as an RF quadplexer. Therefore, the combination of the RF multiplexing circuitry 48 and the first RF receive diplexer 18 functions as an RF quintplexer. In a fourth embodiment of the RF multiplexing circuitry 48, the RF multiplexing circuitry 48 functions as an RF quintplexer. Therefore, the combination of the RF multiplexing circuitry 48 and the first RF receive diplexer 18 functions as an RF hexplexer.

Figure 7:
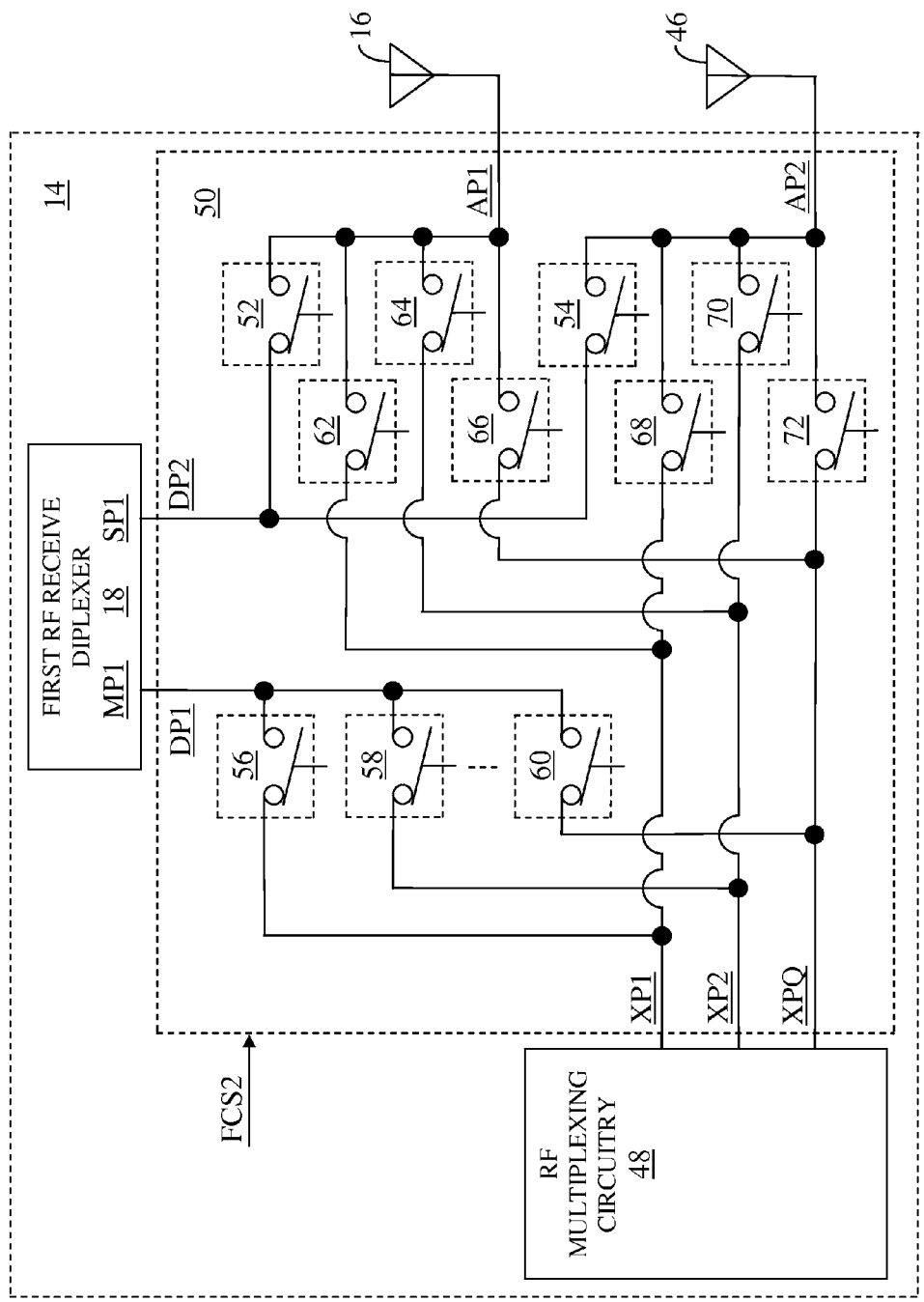
FIG. 7 shows details of the RF front-end circuitry, the first RF antenna, and the second RF antenna illustrated in FIG. 6 according to one embodiment of the RF front-end circuitry.

FIG. 7 shows details of the RF front-end circuitry 14, the first RF antenna 16, and the second RF antenna 46 illustrated in FIG. 6 according to one embodiment of the RF front-end circuitry 14. In the embodiment of the RF front-end circuitry 14 illustrated in FIG. 7, details of the RF antenna switching circuitry 50 are shown to clarify one embodiment of the invention, and the RF receive circuitry 22 and the RF transmit circuitry 24 are not shown to simplify FIG. 7.

The RF antenna switching circuitry 50 includes a first diplexer-to-antenna RF switch 52, a second diplexer-to-antenna RF switch 54, a first diplexer-to-MUX RF switch 56, a second diplexer-to-MUX RF switch 58, and up to and including a $Q^{TH}$ diplexer-to-MUX RF switch 60, a first MUX-to-first antenna switch 62, a second MUX-to-first antenna switch 64, and up to and including a $Q^{TH}$ MUX-to-first antenna RF switch 66, a first MUX-to-second antenna switch 68, a second MUX-to-second antenna switch 70, and up to and including a $Q^{TH}$ MUX-to-second antenna RF switch 72. In an alternate embodiment of the RF antenna switching circuitry 50, any of the RF switches 52, 54, 56, 58, 60, 62, 64, 66, 68, 70, 72 may be omitted.

The first diplexer-to-antenna RF switch 52 is coupled between the first RF antenna port AP1 and the second RF diplexer port DP2. The second diplexer-to-antenna RF switch 54 is coupled between the second RF antenna port AP2 and the second RF diplexer port DP2. The first diplexer-to-MUX RF switch 56 is coupled between the first RF multiplexer port XP1 and the first RF diplexer port DP1. The second diplexer-to-MUX RF switch 58 is coupled between the second RF multiplexer port XP2 and the first RF diplexer port DP1. The $Q^{TH}$ diplexer-to-MUX RF switch 60 is coupled between the $Q^{TH}$ RF multiplexer port XPQ and the first RF diplexer port DP1. The first MUX-to-first antenna switch 62 is coupled between the first RF antenna port AP1 and the first RF multiplexer port XP1. The second MUX-to-first antenna switch 64 is coupled between the first RF antenna port AP1 and the second RF multiplexer port XP2. The $Q^{TH}$ MUX-to-first antenna RF switch 66 is coupled between the first RF antenna port AP1 and the $Q^{TH}$ RF multiplexer port XPQ. The first MUX-to-second antenna switch 68 is coupled between the second RF antenna port AP2 and the first RF multiplexer port XP1. The second MUX-to-second antenna switch 70 is coupled between the second RF antenna port AP2 and the second RF multiplexer port XP2. The $Q^{TH}$ MUX-to-second antenna RF switch 72 is coupled between the second RF antenna port AP2 and the $Q^{TH}$ RF multiplexer port XPQ.

Each of the RF switches 52, 54, 56, 58, 60, 62, 64, 66, 68, 70, 72 is configured to be in one of an OPEN state and a CLOSED state. In one embodiment of the RF system control circuitry 12 (FIG. 6), the RF system control circuitry 12 (FIG. 6) selects the one of the OPEN state and the CLOSED state for each of the RF switches 52, 54, 56, 58, 60, 62, 64, 66, 68, 70, 72. In this regard, the RF system control circuitry 12 (FIG. 6) provides the second function configuration signal FCS2 to the RF antenna switching circuitry 50 to select the one of the OPEN state and the CLOSED state for each of the RF switches 52, 54, 56, 58, 60, 62, 64, 66, 68, 70, 72.

In this regard, the first diplexer-to-antenna RF switch 52 is coupled between the first isolation port SP1 and the first RF antenna 16. The second diplexer-to-antenna RF switch 54 is coupled between the first isolation port SP1 and the second RF antenna 46. In one embodiment of the RF communications circuitry 10 (FIG. 6), one of the first diplexer-to-antenna RF switch 52 and the second diplexer-to-antenna RF switch 54 is configured to be in the OPEN state and another of the first diplexer-to-antenna RF switch 52 and the second diplexer-to-antenna RF switch 54 is configured to be in the CLOSED state. As such, selection of the one of the first diplexer-to-antenna RF switch 52 and the second diplexer-to-antenna RF switch 54 and the another of the first diplexer-to-antenna RF switch 52 and the second diplexer-to-antenna RF switch 54 is based on the second function configuration signal FCS2.

In one embodiment of the RF communications circuitry 10 (FIG. 6), the RF communications circuitry 10 (FIG. 6) operates in one of a receive carrier aggregation (CA) mode and a non-CA mode. The RF system control circuitry 12 (FIG. 6) selects the one of the receive CA mode and the non-CA mode. As such, the RF system control circuitry 12 (FIG. 6) provides the second function configuration signal FCS2 based on the selection of the one of the receive CA mode and the non-CA mode. During the non-CA mode, both the first diplexer-to-antenna RF switch 52 and the second diplexer-to-antenna RF switch 54 are in the OPEN state, thereby substantially isolating the first RF receive diplexer 18 from both the first RF antenna 16 and the second RF antenna 46. During the receive CA mode, one of the first diplexer-to-antenna RF switch 52 and the second diplexer-to-antenna RF switch 54 is in the OPEN state and another of the first diplexer-to-antenna RF switch 52 and the second diplexer-to-antenna RF switch 54 is in the CLOSED state.

Figure 8:
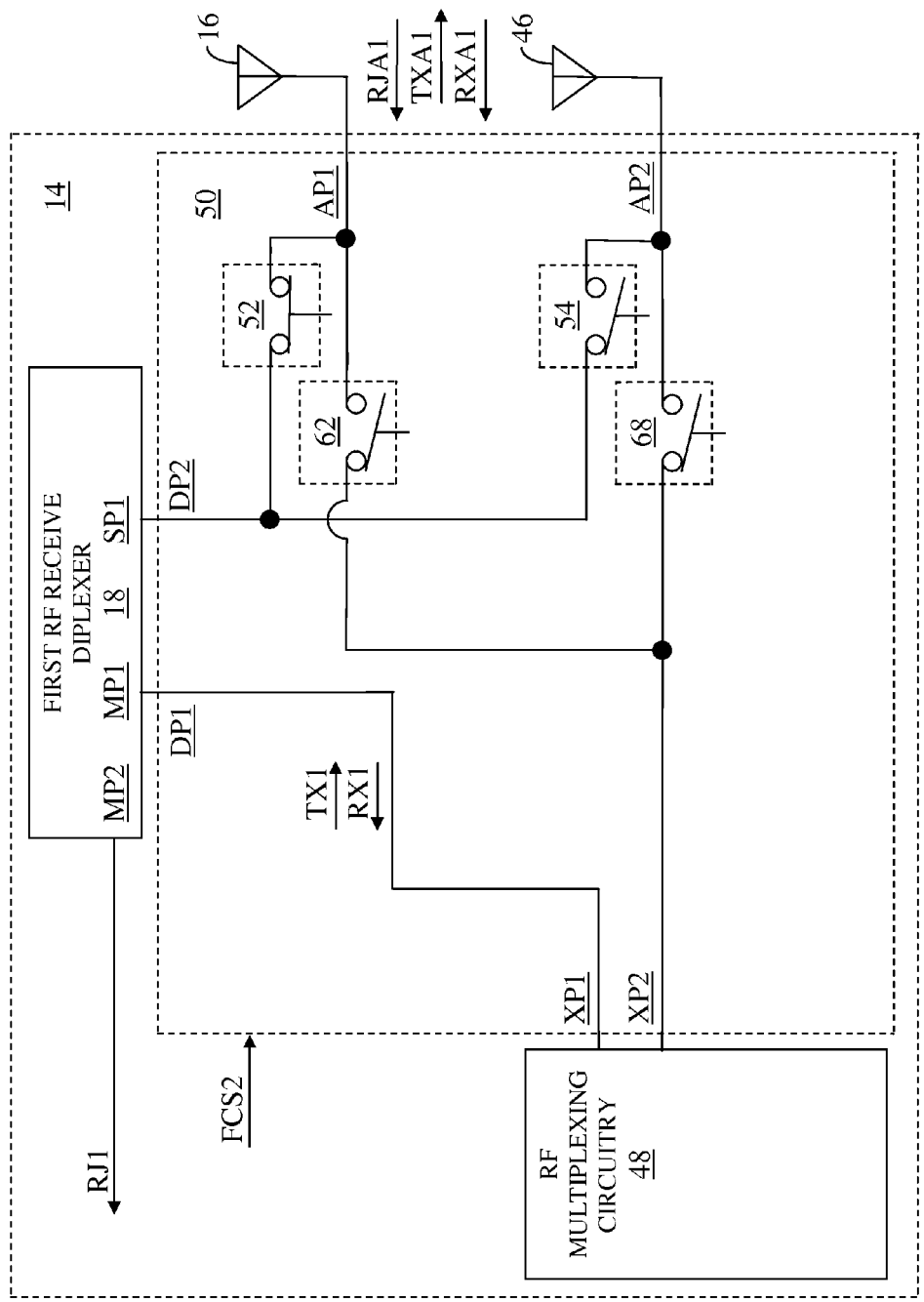
FIG. 8 shows details of the RF front-end circuitry, the first RF antenna, and the second RF antenna illustrated in FIG. 6 according to an alternate embodiment of the RF front-end circuitry.

FIG. 8 shows details of the RF front-end circuitry 14, the first RF antenna 16, and the second RF antenna 46 illustrated in FIG. 6 according to an alternate embodiment of the RF front-end circuitry 14. The RF front-end circuitry 14 illustrated in FIG. 8 is similar to the RF front-end circuitry 14 illustrated in FIG. 7, except in the RF front-end circuitry 14 illustrated in FIG. 8, the first diplexer-to-MUX RF switch 56, the second diplexer-to-MUX RF switch 58, the $Q^{TH}$ diplexer-to-MUX RF switch 60, the second MUX-to-first antenna switch 64, the $Q^{TH}$ MUX-to-first antenna RF switch 66, the second MUX-to-second antenna switch 70, and the $Q^{TH}$ MUX-to-second antenna RF switch 72 are omitted.

Additionally, the first RF diplexer port DP1 is directly coupled to the first RF multiplexer port XP1. The first MUX-to-first antenna switch 62 is coupled between the first RF antenna port AP1 and the second RF multiplexer port XP2 instead of being coupled between the first RF antenna port AP1 and the first RF multiplexer port XP1 as illustrated in FIG. 7. The first MUX-to-second antenna switch 68 is coupled between the second RF antenna port AP2 and the second RF multiplexer port XP2 instead of being coupled between the second RF antenna port AP2 and the first RF multiplexer port XP1 as illustrated in FIG. 7.

In the RF front-end circuitry 14 illustrated in FIG. 8, the first diplexer-to-antenna RF switch 52 is in the CLOSED state and each of the second diplexer-to-antenna RF switch 54, the first MUX-to-first antenna switch 62, and the first MUX-to-second antenna switch 68 is in the OPEN state. As such, the first RF antenna 16 is connected to the first isolation port SP1 via the first diplexer-to-antenna RF switch 52. The first main port MP1 is connected to the RF multiplexing circuitry 48. If the RF multiplexing circuitry 48 provides the same functionality as the first RF duplexer 20 (FIG. 1), then the RF front-end circuitry 14 provides similar behavior to the RF front-end circuitry 14 illustrated in FIG. 1. As such, the first adjunct RF antenna receive signal RJA1, the first RF antenna transmit signal TXA1, and the first RF antenna receive signal RXA1 are associated with a single RF antenna, namely the first RF antenna 16.

Therefore, the first RF receive diplexer 18 receives the first RF antenna receive signal RXA1 via the first isolation port SP1 to provide the first RF receive signal RX1 via the first main port MP1. In one embodiment of the first RF receive signal RX1 and the first adjunct RF receive signal RJ1, the first RF receive signal RX1 and the first adjunct RF receive signal RJ1 are carrier aggregation RF receive signals.

Figure 9:
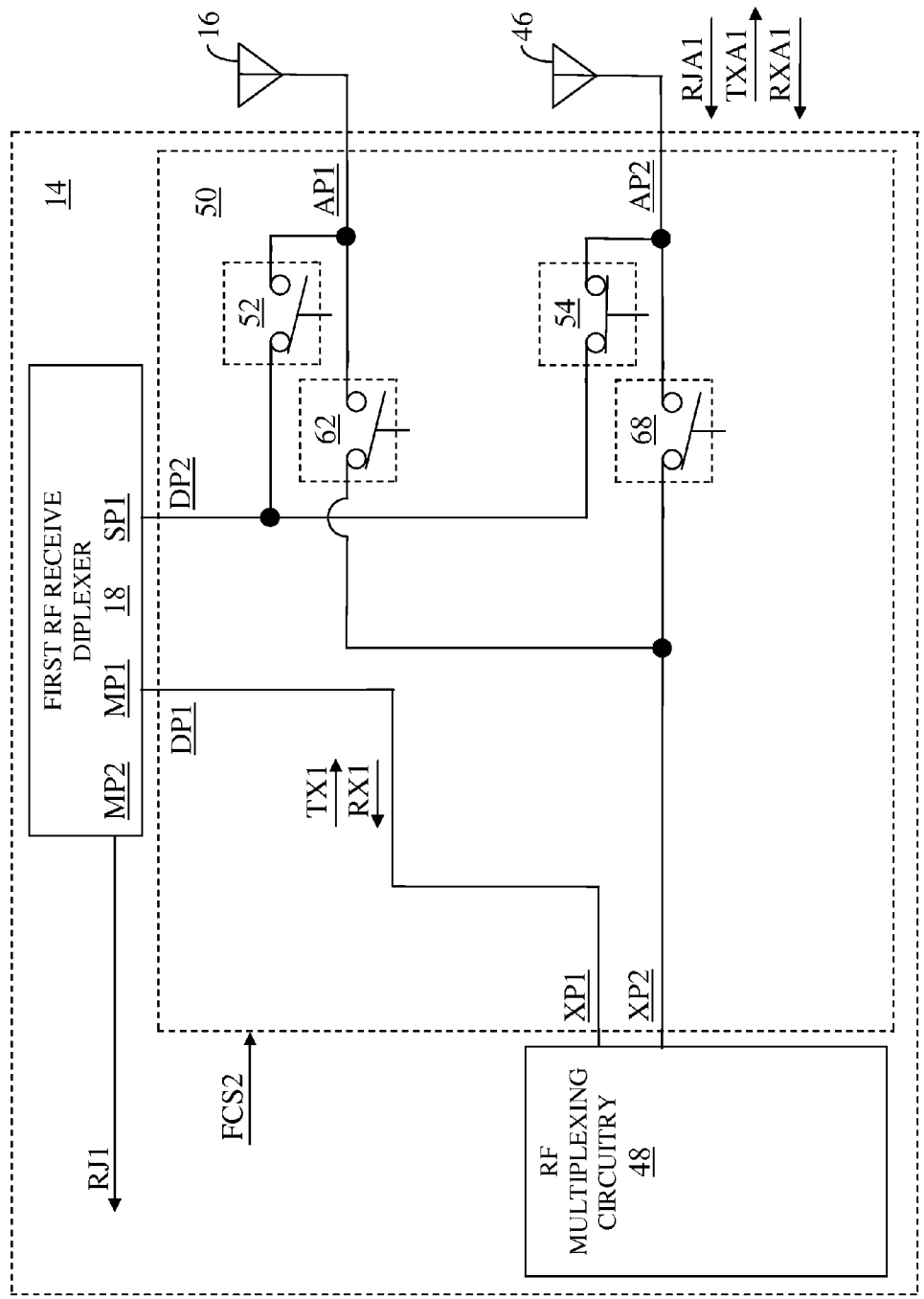
FIG. 9 shows details of the RF front-end circuitry, the first RF antenna, and the second RF antenna illustrated in FIG. 6 according to an additional embodiment of the RF front-end circuitry.

FIG. 9 shows details of the RF front-end circuitry 14, the first RF antenna 16, and the second RF antenna 46 illustrated in FIG. 6 according to an additional embodiment of the RF front-end circuitry 14. The RF front-end circuitry 14 illustrated in FIG. 9 is similar to the RF front-end circuitry 14 illustrated in FIG. 8, except in the RF front-end circuitry 14 illustrated in FIG. 9, the second diplexer-to-antenna RF switch 54 is in the CLOSED state and each of the first diplexer-to-antenna RF switch 52, the first MUX-to-first antenna switch 62, and the first MUX-to-second antenna switch 68 is in the OPEN state. As such, the second RF antenna 46 is connected to the first isolation port SP1 via the second diplexer-to-antenna RF switch 54. Therefore, the first adjunct RF antenna receive signal RJA1, the first RF antenna transmit signal TXA1, and the first RF antenna receive signal RXA1 are associated with a single RF antenna, namely the second RF antenna 46.

Figure 10:
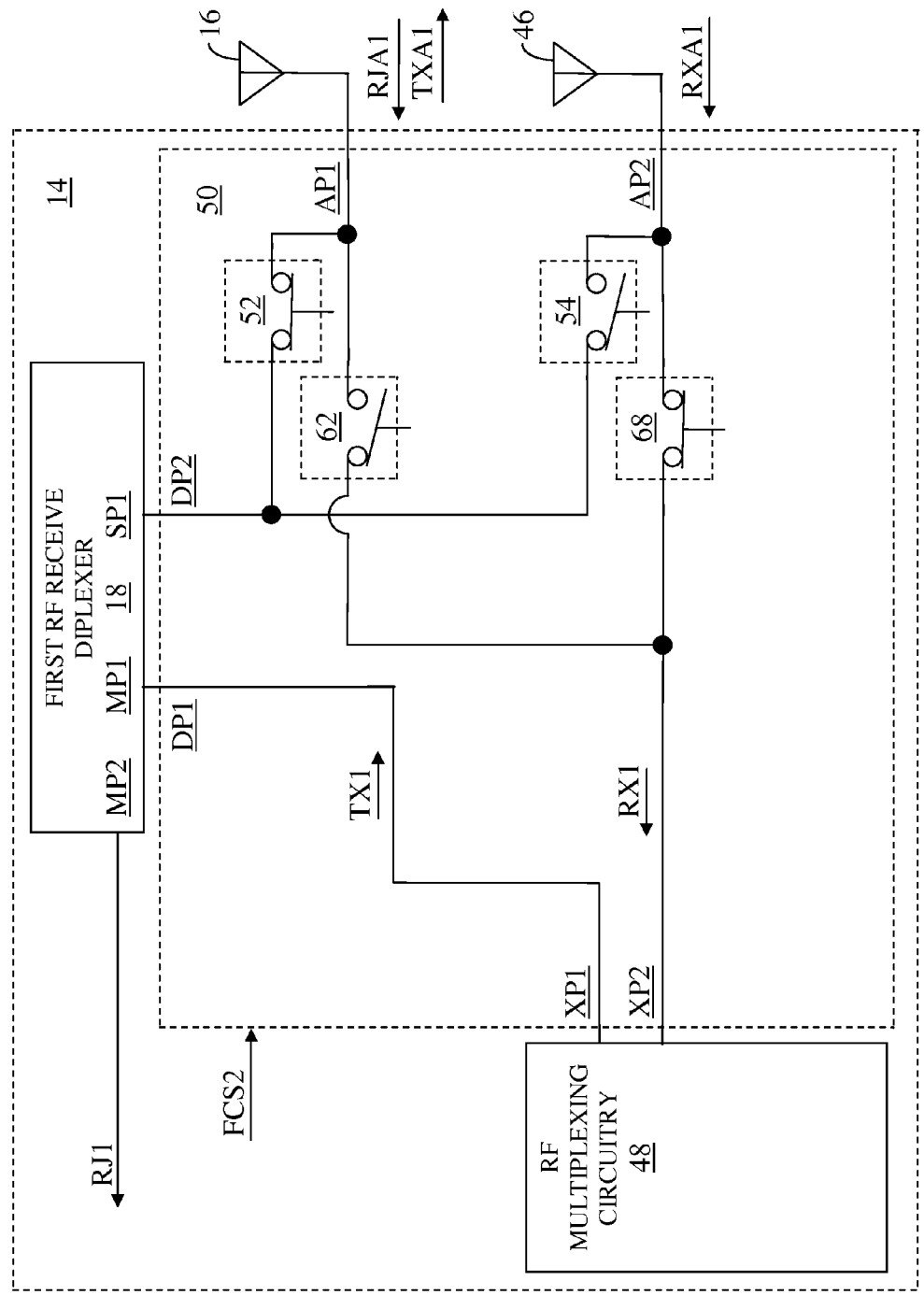
FIG. 10 shows details of the RF front-end circuitry, the first RF antenna, and the second RF antenna illustrated in FIG. 6 according to another embodiment of the RF front-end circuitry.

FIG. 10 shows details of the RF front-end circuitry 14, the first RF antenna 16, and the second RF antenna 46 illustrated in FIG. 6 according to another embodiment of the RF front-end circuitry 14. The RF front-end circuitry 14 illustrated in FIG. 10 is similar to the RF front-end circuitry 14 illustrated in FIG. 8, except in the RF front-end circuitry 14 illustrated in FIG. 10, both the first diplexer-to-antenna RF switch 52 and the first MUX-to-second antenna switch 68 are in the CLOSED state and both of the second diplexer-to-antenna RF switch 54 and the first MUX-to-first antenna switch 62 are in the OPEN state. As such, the first RF antenna 16 is connected to the first isolation port SP1 via the first diplexer-to-antenna RF switch 52 and the second RF antenna 46 is connected to the RF multiplexing circuitry 48 via the first MUX-to-second antenna switch 68. Therefore, the first adjunct RF antenna receive signal RJA1 and the first RF antenna transmit signal TXA1 are associated with the first RF antenna 16, and the first RF antenna receive signal RXA1 is associated with the second RF antenna 46.

In this regard, the RF multiplexing circuitry 48 receives the first RF receive signal RX1 via the second RF antenna 46 and the RF receive circuitry 22 (FIG. 6) receives the first adjunct RF receive signal RJ1 via the first RF antenna 16. Therefore, in one embodiment of the first RF receive signal RX1 and the first adjunct RF receive signal RJ1, the first RF receive signal RX1 and the first adjunct RF receive signal RJ1 are carrier aggregation RF receive signals. In one embodiment of the first adjunct RF receive signal RJ1, the first adjunct RF receive signal RJ1 is a diversity RF receive signal. In one embodiment of the first adjunct RF receive signal RJ1, the first adjunct RF receive signal RJ1 is a MIMO RF receive signal.

Figure 11:
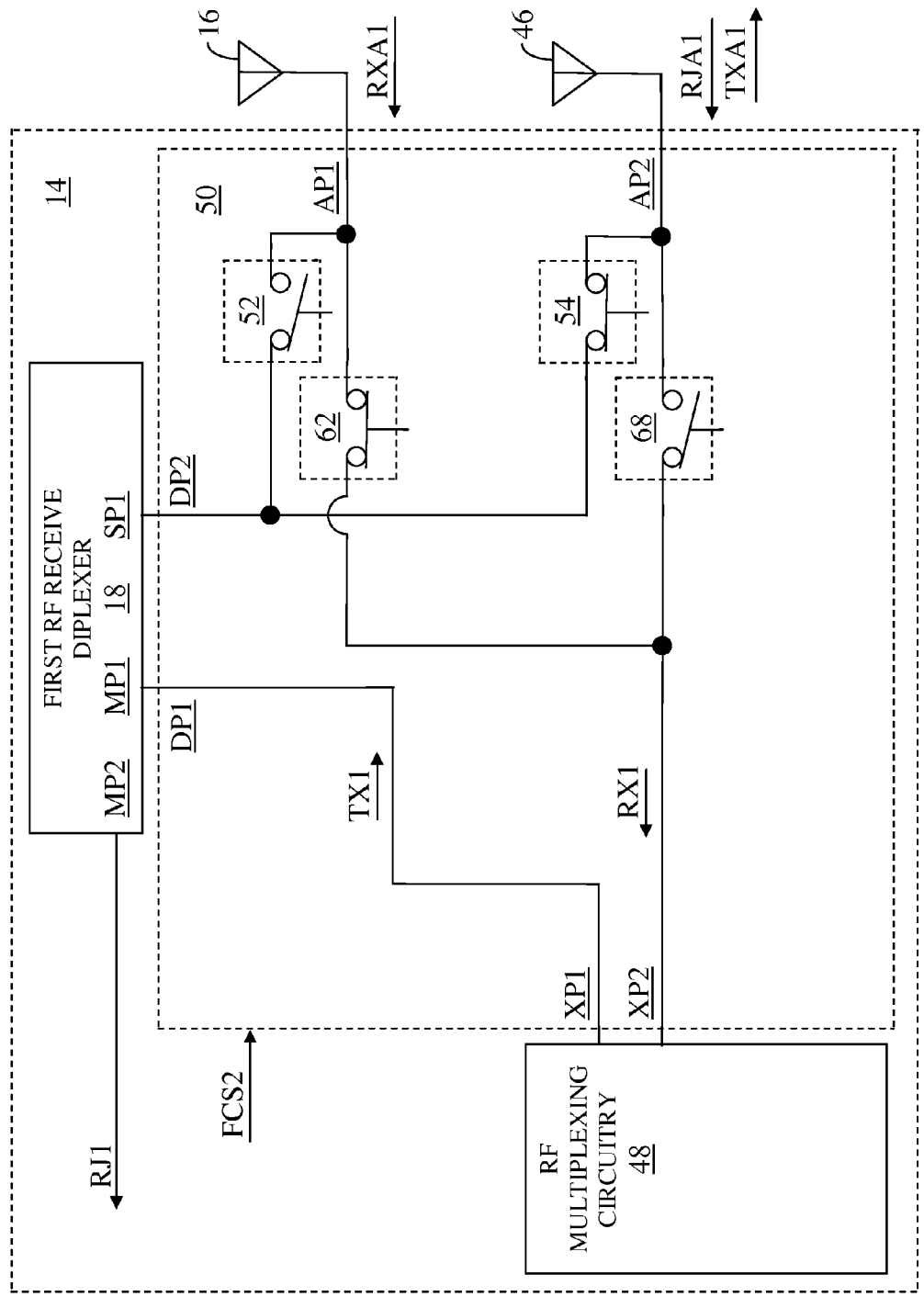
FIG. 11 shows details of the RF front-end circuitry, the first RF antenna, and the second RF antenna illustrated in FIG. 6 according to a further embodiment of the RF front-end circuitry.

FIG. 11 shows details of the RF front-end circuitry 14, the first RF antenna 16, and the second RF antenna 46 illustrated in FIG. 6 according to a further embodiment of the RF front-end circuitry 14. The RF front-end circuitry 14 illustrated in FIG. 11 is similar to the RF front-end circuitry 14 illustrated in FIG. 10, except in the RF front-end circuitry 14 illustrated in FIG. 11, both the first diplexer-to-antenna RF switch 52 and the first MUX-to-second antenna switch 68 are in the OPEN state and both of the second diplexer-to-antenna RF switch 54 and the first MUX-to-first antenna switch 62 are in the CLOSED state. As such, the second RF antenna 46 is connected to the first isolation port SP1 via the second diplexer-to-antenna RF switch 54 and the first RF antenna 16 is connected to the RF multiplexing circuitry 48 via the first MUX-to-first antenna switch 62. Therefore, the first adjunct RF antenna receive signal RJA1 and the first RF antenna transmit signal TXA1 are associated with the second RF antenna 46, and the first RF antenna receive signal RXA1 is associated with the first RF antenna 16.

In this regard, the RF multiplexing circuitry 48 receives the first RF receive signal RX1 via the first RF antenna 16 and the RF receive circuitry 22 (FIG. 6) receives the first adjunct RF receive signal RJ1 via the second RF antenna 46. Therefore, in one embodiment of the first RF receive signal RX1 and the first adjunct RF receive signal RJ1, the first RF receive signal RX1 and the first adjunct RF receive signal RJ1 are carrier aggregation RF receive signals. In one embodiment of the first adjunct RF receive signal RJ1, the first adjunct RF receive signal RJ1 is a diversity RF receive signal. In one embodiment of the first adjunct RF receive signal RJ1, the first adjunct RF receive signal RJ1 is a MIMO RF receive signal.

In one embodiment of the first RF transmit signal TX1, the first RF receive signal RX1, and the first adjunct RF receive signal RJ1; the first RF transmit signal TX1 is a Band 5 transmit signal, the first RF receive signal RX1 is a Band 5 receive signal, and the first adjunct RF receive signal RJ1 is a Band 12 MIMO receive signal. In this regard, a carrier frequency of the first RF transmit signal TX1 is between about 824 megahertz and about 849 megahertz. A carrier frequency of the first RF receive signal RX1 is between about 869 megahertz and about 894 megahertz. A carrier frequency of the first adjunct RF receive signal RJ1 is between about 729 megahertz and about 746 megahertz.

In an alternate embodiment of the first RF transmit signal TX1, the first RF receive signal RX1, and the first adjunct RF receive signal RJ1; the first RF transmit signal TX1 is a Band 12 transmit signal, the first RF receive signal RX1 is a Band 12 receive signal, and the first adjunct RF receive signal RJ1 is a Band 5 MIMO receive signal. In this regard, the carrier frequency of the first RF transmit signal TX1 is between about 699 megahertz and about 716 megahertz. The carrier frequency of the first RF receive signal RX1 is between about 729 megahertz and about 746 megahertz. The carrier frequency of the first adjunct RF receive signal RJ1 is between about 869 megahertz and about 894 megahertz.

In an additional embodiment of the first RF transmit signal TX1, the first RF receive signal RX1, and the first adjunct RF receive signal RJ1; the first RF transmit signal TX1 is a Band 5 transmit signal, the first RF receive signal RX1 is a Band 5 receive signal, and the first adjunct RF receive signal RJ1 is a Band 13 MIMO receive signal. In this regard, the carrier frequency of the first RF transmit signal TX1 is between about 824 megahertz and about 849 megahertz. The carrier frequency of the first RF receive signal RX1 is between about 869 megahertz and about 894 megahertz. The carrier frequency of the first adjunct RF receive signal RJ1 is between about 746 megahertz and about 756 megahertz.

In another embodiment of the first RF transmit signal TX1, the first RF receive signal RX1, and the first adjunct RF receive signal RJ1; the first RF transmit signal TX1 is a Band 13 transmit signal, the first RF receive signal RX1 is a Band 13 receive signal, and the first adjunct RF receive signal RJ1 is a Band 5 MIMO receive signal. In this regard, the carrier frequency of the first RF transmit signal TX1 is between about 777 megahertz and about 787 megahertz. The carrier frequency of the first RF receive signal RX1 is between about 746 megahertz and about 756 megahertz. The carrier frequency of the first adjunct RF receive signal RJ1 is between about 868 megahertz and about 894 megahertz.

Figure 12:
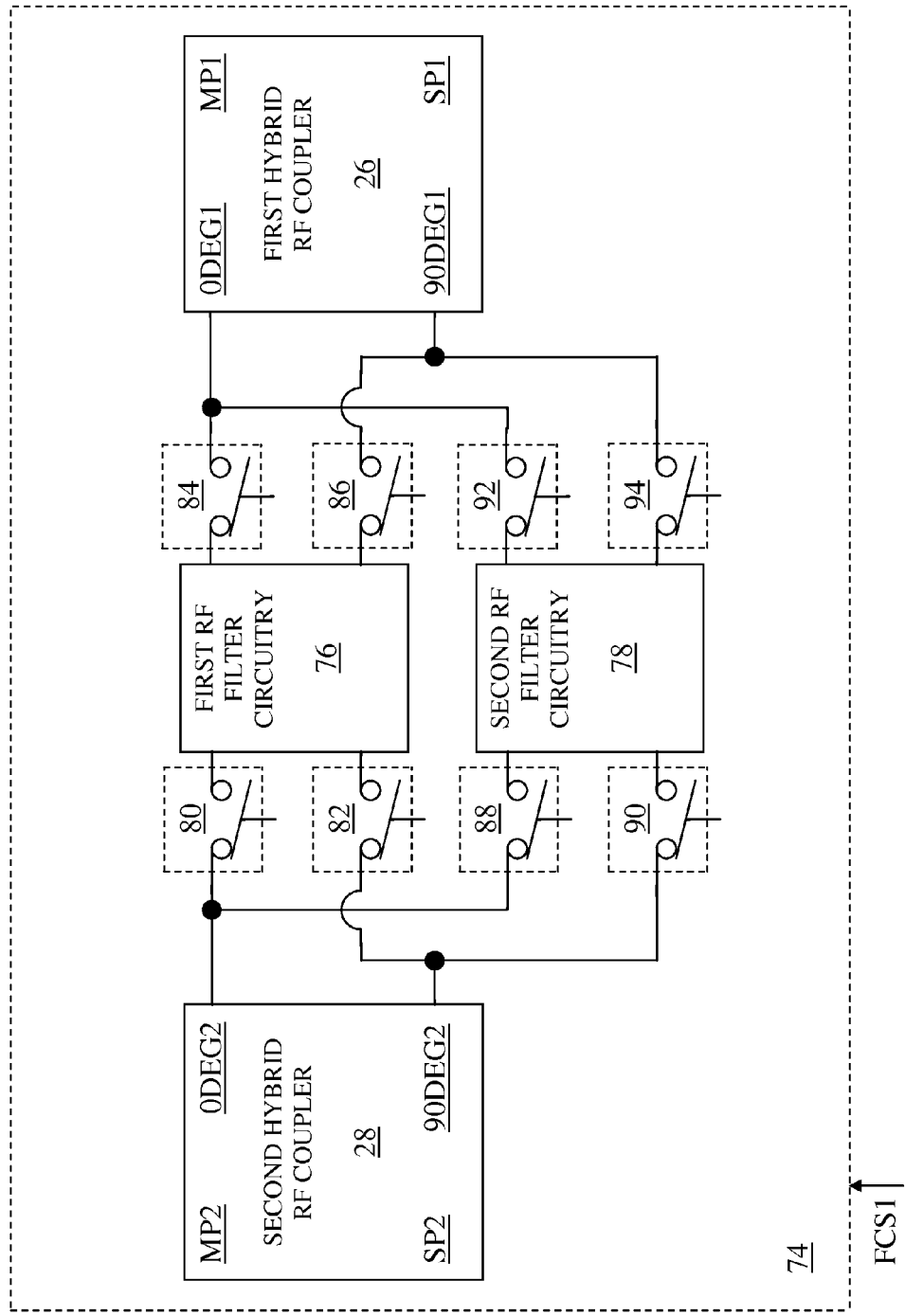
FIG. 12 shows details of a reconfigurable RF receive diplexer according to one embodiment of the reconfigurable RF receive diplexer.

FIG. 12 shows details of a reconfigurable RF receive diplexer 74 according to one embodiment of the reconfigurable RF receive diplexer 74. The reconfigurable RF receive diplexer 74 includes the first hybrid RF coupler 26, the second hybrid RF coupler 28, first RF filter circuitry 76, second RF filter circuitry 78, a first diplexer RF switch 80, a second diplexer RF switch 82, a third diplexer RF switch 84, a fourth diplexer RF switch 86, a fifth diplexer RF switch 88, a sixth diplexer RF switch 90, a seventh diplexer RF switch 92, and an eighth diplexer RF switch 94.

The first diplexer RF switch 80 is coupled between the second in-phase port 0DEG2 and the first RF filter circuitry 76. The second diplexer RF switch 82 is coupled between the second quadrature-phase port 90DEG2 and the first RF filter circuitry 76. The third diplexer RF switch 84 is coupled between first in-phase port 0DEG1 and the first RF filter circuitry 76. The fourth diplexer RF switch 86 is coupled between the first quadrature-phase port 90DEG1 and the first RF filter circuitry 76.

The fifth diplexer RF switch 88 is coupled between the second in-phase port 0DEG2 and the second RF filter circuitry 78. The sixth diplexer RF switch 90 is coupled between the second quadrature-phase port 90DEG2 and the second RF filter circuitry 78. The seventh diplexer RF switch 92 is coupled between first in-phase port 0DEG1 and the second RF filter circuitry 78. The eighth diplexer RF switch 94 is coupled between the first quadrature-phase port 90DEG1 and the second RF filter circuitry 78.

In one embodiment of the reconfigurable RF receive diplexer 74, the first RF filter circuitry 76 is associated with a first RF communications band and the second RF filter circuitry 78 is associated with a second RF communications band. The first diplexer RF switch 80, the second diplexer RF switch 82, the third diplexer RF switch 84, and the fourth diplexer RF switch 86 form a first group of diplexer RF switches. The fifth diplexer RF switch 88, the sixth diplexer RF switch 90, the seventh diplexer RF switch 92, and the eighth diplexer RF switch 94 form a second group of diplexer RF switches. When each of the first group of diplexer RF switches is configured to be in a CLOSED state and each of the second group of diplexer RF switches is configured to be in an OPEN state, the first RF filter circuitry 76 is functionally connected between the first hybrid RF coupler 26 and the second hybrid RF coupler 28.

Conversely, when each of the second group of diplexer RF switches is configured to be in a CLOSED state and each of the first group of diplexer RF switches is configured to be in an OPEN state, the second RF filter circuitry 78 is functionally connected between the first hybrid RF coupler 26 and the second hybrid RF coupler 28. Each of the first group of diplexer RF switches and the second group of diplexer RF switches is configured to be in one of the OPEN state and the CLOSED state based on the first function configuration signal FCS1.

Those skilled in the art will recognize improvements and modifications to the embodiments of the present disclosure. All such improvements and modifications are considered within the scope of the concepts disclosed herein and the claims that follow.

What is claimed is:

1. An apparatus comprising:
    a first hybrid Radio Frequency (RF) coupler having a first main port, a first pair of quadrature ports, and a first isolation port, which is coupled to an RF antenna, wherein the first hybrid RF coupler is configured to receive, split, and phase-shift a first RF transmit signal via the first main port to provide a first in-phase RF transmit signal and a first quadrature-phase RF transmit signal to RF filter circuitry, which is coupled between the first pair of quadrature ports and the second pair of quadrature ports; and
    a second hybrid RF coupler having a second main port and a second pair of quadrature ports;
    wherein the first hybrid RF coupler, the second hybrid RF coupler, and the RF filter circuitry form a first RF receive diplexer configured to:
        receive a first adjunct RF antenna receive signal via the first isolation port to provide a first adjunct RF receive signal via the second main port; and
        provide a first RF antenna transmit signal via the first isolation port based on the first in-phase RF transmit signal and the first quadrature-phase RF transmit signal.

2. The apparatus of claim 1 wherein the first RF receive diplexer is further configured to receive a first RF antenna receive signal via the first isolation port to provide a first RF receive signal via the first main port.

3. The apparatus of claim 2 wherein the first RF receive signal and the first adjunct RF receive signal are carrier aggregation RF receive signals.

4. The apparatus of claim 1 wherein:
    the RF filter circuitry is configured to substantially reflect the first in-phase RF transmit signal and the first quadrature-phase RF transmit signal to provide a first reflected in-phase RF transmit signal and a first reflected quadrature-phase RF transmit signal to the first hybrid RF coupler; and
    the first hybrid RF coupler is further configured to receive, phase-shift, and combine the first reflected in-phase RF transmit signal and the first reflected quadrature-phase RF transmit signal to provide the first RF antenna transmit signal via the first isolation port.

5. The apparatus of claim 4 wherein the second hybrid RF coupler is configured to substantially receive, phase-shift, and cancel any of the first in-phase RF transmit signal and the first quadrature-phase RF transmit signal that is allowed through the RF filter circuitry, thereby increasing isolation between the first main port and the second main port.

6. The apparatus of claim 5 wherein the second hybrid RF coupler is a tunable hybrid RF coupler configured to adjust at least one of a phase-shift and a magnitude of the any of the first in-phase RF transmit signal and the first quadrature-phase RF transmit signal that is allowed through the RF filter circuitry based on a function configuration signal.

7. The apparatus of claim 4 wherein the first hybrid RF coupler is a tunable hybrid RF coupler configured to adjust at least one of a phase-shift and a magnitude of the first in-phase RF transmit signal and the first quadrature-phase RF transmit signal based on a function configuration signal.

8. The apparatus of claim 4 wherein:
    the first hybrid RF coupler is further configured to receive a first RF antenna receive signal via the first isolation port, and split and phase-shift the first RF antenna receive signal to provide a first in-phase RF receive signal and a first quadrature-phase RF receive signal to the RF filter circuitry;
    the RF filter circuitry is further configured to substantially reflect the first in-phase RF receive signal and the first quadrature-phase RF receive signal to provide a first reflected in-phase RF receive signal and a first reflected quadrature-phase RF receive signal to the first hybrid RF coupler; and
    the first hybrid RF coupler is further configured to receive, phase-shift, and combine the first reflected in-phase RF receive signal and the first reflected quadrature-phase RF receive signal to provide a first RF receive signal via the first main port.

9. The apparatus of claim 1 wherein the first RF receive diplexer is further configured to receive the first RF transmit signal and the first adjunct RF antenna receive signal simultaneously.

10. The apparatus of claim 1 wherein the RF filter circuitry comprises surface acoustic wave (SAW) RF filter circuitry coupled between the first pair of quadrature ports and the second pair of quadrature ports.

11. The apparatus of claim 10 wherein the first RF receive diplexer further comprises a variable capacitance circuit configured to provide at least one variable capacitance to the SAW RF filter circuitry, wherein filtering characteristics of the RF filter circuitry are based on the at least one variable capacitance, which is based on a function configuration signal.

12. The apparatus of claim 1 wherein the RF filter circuitry comprises bulk acoustic wave (BAW) RF filter circuitry coupled between the first pair of quadrature ports and the second pair of quadrature ports.

13. The apparatus of claim 12 wherein the first RF receive diplexer further comprises a variable capacitance circuit configured to provide at least one variable capacitance to the BAW RF filter circuitry, wherein filtering characteristics of the RF filter circuitry are based on the at least one variable capacitance, which is based on a function configuration signal.

14. The apparatus of claim 1 wherein the RF antenna is one of a first RF antenna and a second RF antenna based on a function configuration signal.

15. The apparatus of claim 14 further comprising RF antenna switching circuitry, which comprises a first diplexer-to-antenna RF switch and a second diplexer-to-antenna RF switch; wherein the first diplexer-to-antenna RF switch is coupled between the first isolation port and the first RF antenna, and the second diplexer-to-antenna RF switch is coupled between the first isolation port and the second RF antenna.

16. The apparatus of claim 15 configured to operate in one of a receive carrier aggregation (CA) mode and a non-CA mode based on a function configuration signal; wherein during the receive CA mode, one of the first diplexer-toantenna RF switch and the second diplexer-to-antenna RF switch is configured to be in an OPEN state, and another of the first diplexer-to-antenna RF switch and the second diplexer-to-antenna RF switch is configured to be in a CLOSED state; and during the non-CA mode, both of the first diplexer-to-antenna RF switch and the second diplexer-to-antenna RF switch are configured to be in the OPEN state, thereby substantially isolating the first RF receive diplexer from both the first RF antenna and the second RF antenna.

17. The apparatus of claim 15 wherein one of the first diplexer-to-antenna RF switch and the second diplexer-to-antenna RF switch is configured to be in an OPEN state, and another of the first diplexer-to-antenna RF switch and the second diplexer-to-antenna RF switch is configured to be in a CLOSED state.

18. The apparatus of claim 14 wherein control circuitry is configured to provide the function configuration signal based on selection of the one of the first RF antenna and the second RF antenna.

19. The apparatus of claim 14 wherein the first RF receive diplexer is further configured to receive a first RF antenna receive signal via the first isolation port to provide a first RF receive signal via the first main port.

20. The apparatus of claim 19 wherein the first RF receive signal and the first adjunct RF receive signal are carrier aggregation RF receive signals.

21. The apparatus of claim 14 further comprising RF multiplexing circuitry configured to receive a first RF receive signal via one of the first RF antenna and the second RF antenna.

22. The apparatus of claim 21 wherein the first RF receive signal and the first adjunct RF receive signal are carrier aggregation RF receive signals.

23. The apparatus of claim 21 wherein the first adjunct RF receive signal is a diversity RF receive signal.

24. The apparatus of claim 21 wherein the first adjunct RF receive signal is a multiple-input multiple-output (MIMO) RF receive signal.

25. The apparatus of claim 21 wherein a carrier frequency of the first RF receive signal is between about 869 megahertz and about 894 megahertz, a carrier frequency of the first RF transmit signal is between about 824 megahertz and about 849 megahertz, and a carrier frequency of the first adjunct RF receive signal is between about 729 megahertz and about 746 megahertz.

26. The apparatus of claim 21 wherein a carrier frequency of the first RF receive signal is between about 729 megahertz and about 746 megahertz, a carrier frequency of the first RF transmit signal is between about 699 megahertz and about 716 megahertz, and a carrier frequency of the first adjunct RF receive signal is between about 869 megahertz and about 894 megahertz.

27. The apparatus of claim 21 wherein a carrier frequency of the first RF receive signal is between about 869 megahertz and about 894 megahertz, a carrier frequency of the first RF transmit signal is between about 824 megahertz and about 849 megahertz, and a carrier frequency of the first adjunct RF receive signal is between about 746 megahertz and about 756 megahertz.

28. The apparatus of claim 21 wherein a carrier frequency of the first RF receive signal is between about 746 megahertz and about 756 megahertz, a carrier frequency of the first RF transmit signal is between about 777 megahertz and about 787 megahertz, and a carrier frequency of the first adjunct RF receive signal is between about 869 megahertz and about 894 megahertz.

* * * * *